INVENTOR
HENRY EDWARD MERRITT
BY Cushman Darby & Cushman
ATTORNEYS

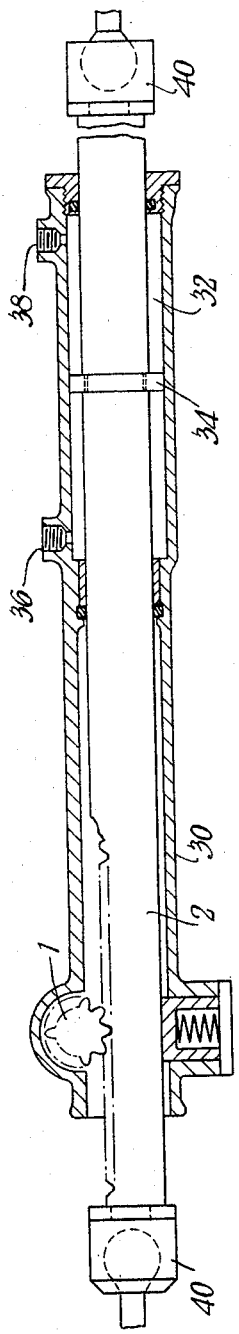
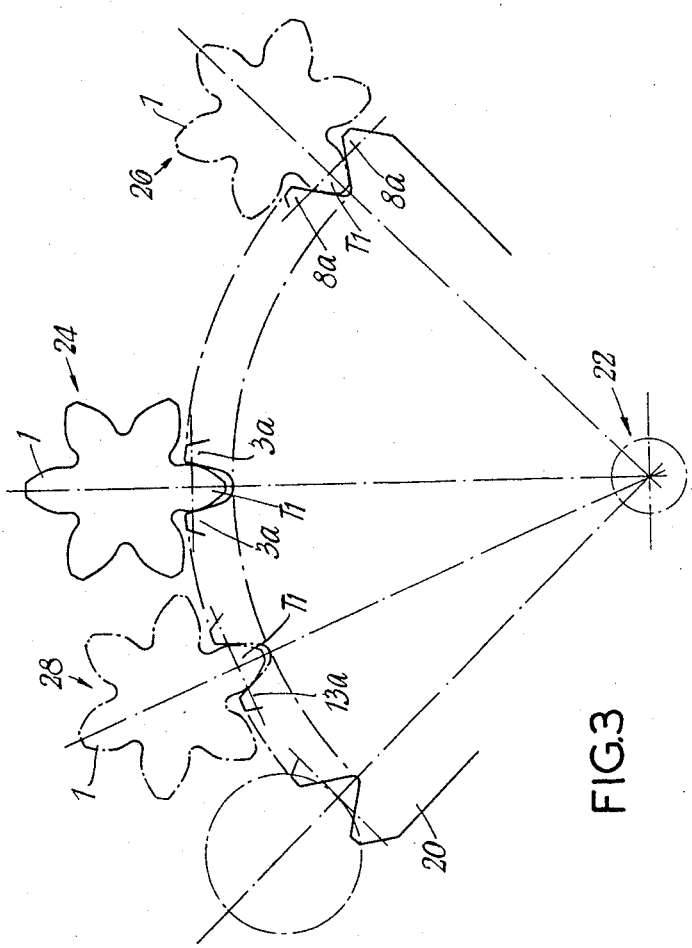
FIG.3
FIG.4
INVENTOR
HENRY EDWARD MERRITT
BY Cushman, Darby & Cushman
ATTORNEYS Aug. 23, 1966    H. E. MERRITT    3,267,763
VARIABLE-RATIO TOOTHED GEARING MECHANISMS
Filed Jan. 23, 1964    4 Sheets-Sheet 4

United States Patent Office 3,267,763
Patented August 23, 1966

3,267,763
VARIABLE-RATIO TOOTHED GEARING MECHANISMS
Henry Edward Merritt, Warwickshire, England, assignor to Merritt & Co. (Engineering) Limited, Warwickshire, England, a British company
Filed Jan. 23, 1964, Ser. No. 339,639
7 Claims. (Cl. 74—422)

This invention relates to variable-ratio toothed gearing mechanisms and is concerned primarily, although not exclusively, with rack and pinion or like mechanisms in which a manually operable hand wheel is arranged to actuate a reciprocating or rotary control member.

One particular example of such a mechanism is to be found in vehicle steering gear which may have the practical requirement that the leverage or velocity ratio afforded by the hand wheel should vary as the hand wheel is moved away from a centred position. Thus, for example, maximum leverage or velocity ratio afforded by the hand wheel in its central or datum position may be required to diminish progressively, or according to a predetermined relationship, with the amount of rotary displacement of the hand wheel from its datum position.

Many forms of variable-ratio toothed gearing mechanisms are known, but characteristically employ non-circular gearing, or a circular gear mounted eccentrically, with its attendant disadvantages which the present invention seeks to obviate.

Accordingly, the invention provides a variable-ratio toothed gearing mechanism including a concentrically mounted driving pinion of circular form and having all its teeth substantially identical and a meshing toothed driven member having at least one group of teeth of progressively varying form and pitch or spacing.

The provision of a concentric circular driving pinion having teeth of constant form is particularly advantageous when the total angular movement of the pinion is required to be more than one revolution. Moreover, the use of a circular driving pinion enables manufacture thereof to be carried out much more easily and cheaply on conventional gear-cutting machines. The manufacture of a toothed driven member in the form of a rack or sector, can be effected by modifying a gear-cutting machine but, in practice, cold forging or other non-cutting process, or broaching, would normally be employed. The form of successive teeth in a group on the driven member is determined in such cases by calculation or by a graphical method.

In order that the invention may be clearly understood and readily carried into effect, an embodiment thereof will now be described in detail with reference to the accompanying drawings, in which:

FIGURE 3 illustrates diagrammatically a second embodiment of the invention wherein the driven member is a sector; the three positions of the pinion on the sector correspond to those illustrated in FIGURE 1 in that datum, intermediate and extreme positions are shown.

FIGURE 4 is a somewhat diagrammatic, elevation view, with some parts broken away, of the gearing mechanism of FIGURES 1 and 2 with exemplary associated hydraulic means for assisting driving of the rack.

Figure 1:
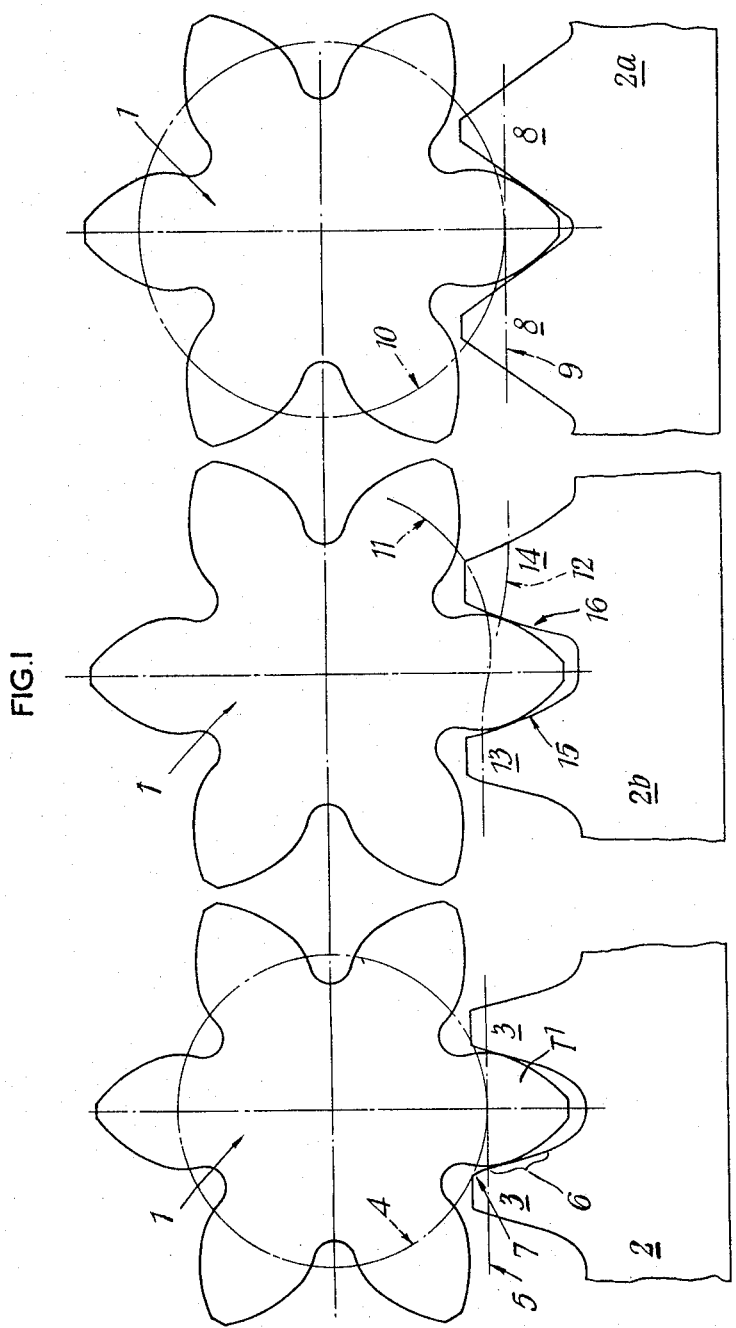
FIGURE 1 shows three sections of the same rack and shows three views of the same pinion in meshing engagement with the respective rack sections.

To assist the clear understanding of the invention, it is convenient to consider, before referring to the drawings, a form of rack and pinion mechanism having a concentric circular pinion, with substantially identical teeth, in engagement with a rack the teeth of which are of constant form and pitch from end to end and such that the linear velocity of the rack in relation to the angular velocity of the pinion is a minimum. In these circumstances, the pitch circle of the pinion may be regarded as rolling with the pitch line of the rack. This pitch line may then coincide with, or be located slightly inside, the crest line of the rack teeth and the pitch circle of the pinion will have a diameter such that the linear displacement of the rack, for one revolution of the pinion, is equal to the circumference of the pitch circle. The pitch of the rack teeth is then equal to this displacement divided by the number of teeth on the pinion.

A second form of rack and pinion mechanism should now be considered, in which the same pinion may be regarded as engaging with a modified rack and as having a larger pitch circle. The pitch line of the rack is then displaced from the position previously described to a new position nearer the roots of the rack teeth. The pitch of the rack teeth is then greater than in the form previously described, in the ratio of the respective pitch diameters of the pinion in the two forms of rack and pinion mechanism.

For the purposes of the invention, the two above-mentioned rack and pinion forms are combined into a single rack and pinion mechanism having a circular pinion with substantially identical teeth and a rack with teeth of a minimum pitch at the centre and maximum pitch at the ends. The transition from one group of teeth to the other on the rack may be obtained by progressive variation in pitch or spacing of the rack teeth, with a corresponding variation in tooth form, the effect of which is to give the pinion a pitch radius which varies from point to point during the transition.

Referring now to FIGURE 1 of the drawings, a pinion 1 having six identical teeth is shown, at the left-hand end of the figure, with one tooth T¹ positioned with its radial centre line at right-angles to the axis of rack section 2. Teeth 3, 3 on the rack section 2 are disposed symmetrically on opposite sides of the central or datum transverse plane of the rack. In this position of the rack relative to the pinion, the velocity ratio has its maximum designed value. The pitch circle 4 of the pinion rolls with the pitch line 5 of the rack. This pitch line 5 is a straight line, parallel with the axis of the rack, and extends over as many rack teeth as may be of similar form, to transmit uniform velocity ratio.

The teeth 3, 3 of the rack section 2 correspond substantially in outline to the teeth of a hob by which the pinion will be generated. The form of the rack teeth 3, 3 may be arbitrarily chosen but, in the preferred construction, the portion 6 of the profile is a straight line, in order that it may generate involute profiles on the pinion. The straight portion 6 is carried only far enough to generate the involute profile of the pinion, and below the region which is in effective contact with the pinion during generation, it may conveniently be curved outwards in order to increase the strength of the rack teeth. The portion of the rack or hob tooth profile 7 near the tips is "eased" or "modified" by a circular arc in order to prevent undercutting of the pinion teeth.

At the right-hand end of FIGURE 1, the same pinion 1 is shown in engagement with teeth 8, 8 on rack section 2a. These teeth are those at the ends of the rack making contact with the pinion at the maximum displacement of the rack from its datum position. The rack teeth 8, 8 in this region have a pitch line 9 which rolls with pitch circle 10 of the pinion. This is the maximum pitch diameter of the pinion, corresponding to the minimum velocity ratio. The pitch of a group of similar teeth in this region is greater than that of the group of rack teeth 3, 3 in the ratio of the pitch diameters of the pitch circles 4 and 10 respectively. With a pinion having involute teeth when generated as shown, the profiles of the rack teeth 8, 8 are straight-sided, but of higher pressure angle than the rack teeth 3, 3.

In the centre of FIGURE 1 the pinion 1 is shown in an intermediate position engaging rack section 2b where the velocity ratio is changing. It may be imagined that the pinion is rotating in a clockwise direction as viewed in the drawing and driving the rack from right to left with progressively increasing linear velocity. In this condition, the pinion does not have a concentric pitch circle of constant diameter as in the classical concept. Instead, the rack is given a pre-determined acceleration, for a period commencing with the rack in its datum position, and the centre portion of FIGURE 1 represents an instant during the period of acceleration.

In terms of the science of odontics, the relative motion of the pinion and the rack over a range of motion on either side of the centre position illustrated in FIGURE 1 corresponds to the rolling of a non-circular pitch surface 11 of the pinion with a non-linear or non-planar pitch surface 12 of rack teeth 13, 14 and other adjacent. Because of the non-uniformity of relative motion, the tooth profiles of the rack teeth are not straight-sided, although they engage involute profiles of the pinion. In the relative position shown by the centre pinion and rack section 2b of FIGURE 1, a driven flank 15 of rack tooth 13 becomes concave, and the trailing flank 16 convex. The changes of slope of there profiles correspond to the progressive increase of pressure angle as motion proceeds, and the progressive increase of the pitch of adjacent rack teeth.

In order to determine the form of the rack, the pitch diameter of the pinion shown at the left-hand end of FIGURE 1 is determined by the maximum velocity ratio required by the installation. The profile of the rack teeth 3, 3, regarded as teeth in the hob by which the pinion will be generated, is conveniently based on the choice of a pressure angle of some 10° to 20° over the straight-line portion 6 of the flanks. The proportions and respective thicknesses of the teeth of the rack and pinion are chosen to combine the maximum duration of contact with substantially equal strength of the pinion and rack. These details are well known to those skilled in the art of gear-tooth design. The proportions thus determined serve to define precisely the form of the pinion teeth and of the hob by which they will be produced.

It is next necessary to determine the form of the rack teeth at the ends of the rack i.e. those that will give the minimum velocity ratio. This is limited by the tendency of these teeth to run to a point with loss of duration of contact. In practice the pressure angle in this region may be 30° to 40°. The ratio of the maximum to the minimum velocity ratio may thus be, for example, $$\frac{\sec 35°}{\sec 15°}$$

or, for the purpose of this description, a ratio of 1.2:1.

It is next necessary to determine the amount of rotation of the pinion, conveniently expressed as the number of pitches, during which the velocity ratio will change from the maximum to the minimum value. This period could extend over the movement of the rack from its datum to an extreme position. When the invention is applied to the steering mechanism of a road vehicle, however, it is found desirable that the change in velocity ratio should take place during the earlier part of the travel of the rack, following a brief period of maximum angular velocity ratio on either side of the datum position.

The curve or law which may govern the change of velocity offers wide variety of choice. The simplest basis, when the tooth profiles of the rack are to be determined by a graphical procedure, is to adopt constant acceleration over the transition period. Such graphical procedure will now be described in more detail with reference to FIGURE 2 of the drawings.

In this figure ordinate $AO^1$ corresponds to the datum position, when the pinion (not shown in this position) will have its centre at $O^1$. The tooth-space of the rack symmetrical about this ordinate has the basic form already determined. Ordinate $BO^2$ corresponds to the position of the pinion relative to the rack at which the acceleration period will begin when the pinion has its centre at $O^2$ and tooth $T^2$ engages with a tooth-space in the rack. Let the datum pitch of the pinion (i.e. the pitch of the rack at maximum velocity ratio) be $P^0$ and let it be decided that the acceleration period shall cover N pitches of movement of the pinion. In the illustration $N=3$.

Projected above the graph is a velocity diagram, showing the velocity $V^0$ of the rack corresponding to any arbitrary angular velocity of the pinion, in the datum position. After $N(=3)$ pitches of rotation of the pinion, the acceleration has been completed; the terminal velocity of the rack will be $R.V^0$ where R is the ratio of the maximum to the minimum velocity, or the ratio of the maximum to the minimum velocity ratio.

Projected above the velocity diagram in the figure is a displacement diagram, showing the additional axial movement of the rack as the rotation of the pinion proceeds, and the curve of displacement is, from the well known principles of mechanics, a parabola having its vertex on the ordinate $BO^2$. The total displacement at the end of acceleration is denoted by L. Since the mean velocity during acceleration is $\frac{1}{2}V^0(1+R)$, the mean additional velocity will be $\frac{1}{2}V^0(1+R)-V^0$, or $\frac{1}{2}V^0(R-1)$. The additional relative displacement of the pinion, compared with its displacement if there were no acceleration, will be proportional to the mean additional velocity whence, by simple algebra, $L=\frac{1}{2}N.P^0(R-1)$. Thus in the case illustrated if $N=3$ and $R=1.2$, $L=0.3P^0$.

At the end of the acceleration period, the centre of the pinion will be located at $O^4$ in the ordinate $CO^4$ distant $N.P^0+L$ from the starting ordinate $BO^2$. From this position onwards, the teeth of the rack will be similar, corresponding to the maximum velocity.

Figure 2:
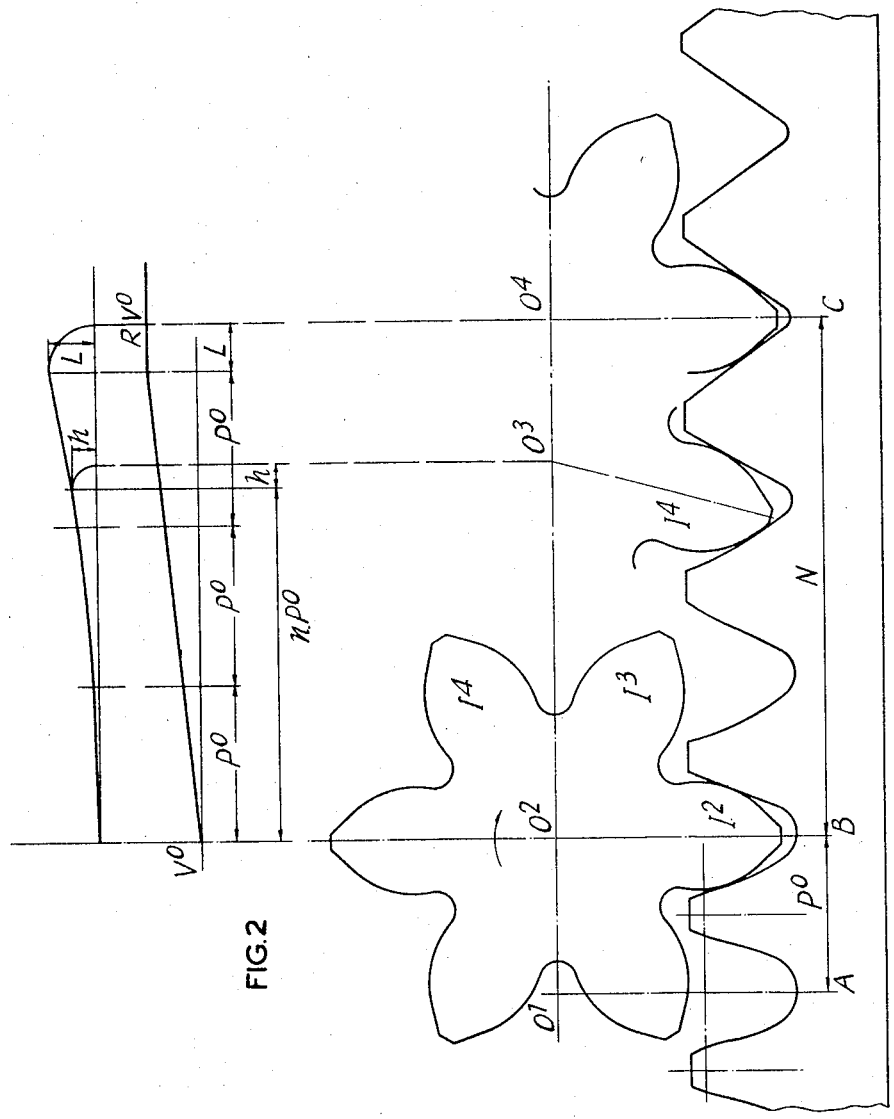
FIGURE 2 illustrates diagrammatically a graphical procedure for determining the form of the rack teeth in a mechanism as shown in FIGURE 1.

Any intermediate position of the pinion may be found as follows. Let the pinion have rotated $n$ pitches. Its axial displacement relative to the rack will be greater than $n.P^0$ by the height $h$ of the parabola of displacement and its centre will be located at $O^3$, distant $n.P^0+h$ from ordinate $BO^2$. The magnitude of $h$ is given by $h=L(n/N)$. At the same instant, its rotation from its position when on ordinate $BO^2$ is $n$ pitches. Consequently, the outline of the pinion may be drawn, with the aid of a templet, in the position about centre $O^3$ in its correct angular relationship. This procedure is repeated for as many successive values of $n$ as may be necessary in order to determine the profiles of the several rack teeth with sufficient accuracy. In FIGURE 2 of the drawings only one such position has been shown, for the sake of simplicity and clarity in the illustration.

If the operation of generating the profiles of the rack teeth is performed by mechanical means, the use of a sine curve for the curve of displacement, instead of the parabola chosen above, enables the supplementary displacement of the pinion to be effected by means of an eccentric geared to the rotation of the pinion, in a manner which will be readily appreciated by those skilled in kinematics.

It will be appreciated that the manner in which the velocity ratio of a gearing mechanism of the invention is made to vary can be chosen arbitrarily, according to requirements of the installation. It may thus be decided that a group of rack teeth in the region of the centre of the rack shall be similar, and correspond to the maximum velocity-ratio, with a group of similar teeth at the ends of the rack corresponding to the minimum velocity-ratio. In order to give a smooth transition between these extremes, which will not give rise to interference in the tooth profile, the described procedure for forming the rack teeth may be adopted.

Instead of a rack, the driven member may equally be a sector, and in this case the principles already described can still apply, the only difference being that linear displacement of the rack is replaced by angular movement of the sector. Such a construction is shown in FIGURE 3, wherein the concentrically mounted pinion 1 having six identical teeth is shown meshing with the teeth of the sector 20. The sector 20 is mounted at 22 for angular movement, driven by the pinion 1. The teeth of the sector 20 vary as the teeth of the rack of FIGURES 1 and 2 and are therefore matchingly numeraled but for "a" subscripts. Those skilled in the science of odontics will have no difficulty applying the description hereinabove relating to determining the form of the rack 2 to determining the form of the sector 20. A datum position is shown at 24, an extreme position at 26 and an intermediate position at 28. A gear combination as described may also be supplemented by a servo mechanism, by which the force applied by the pinion to the rack is magnified, e.g. by hydraulic means. An exemplary construction is shown in FIGURE 4 wherein the force applied by the pinion 1 to induce movement of the rack 2 is supplemented by a conventional "power steering" mechanism which includes a housing 30 circumferentially surrounding at least a part of the rack 2 and defining a cylinder 32; a piston 34 fixed on the rack and slidable within the cylinder upon the introduction of fluid to either side of the piston 34 through ports 36, 38, conventional tubing and valving (not shown) being employed to direct pressurized fluid into the cylinder 32 through port 36 as the pinion 1 is rotated counter-clockwise in order to assist movement of the rack 2 rightwardly and to direct pressurized fluid into the cylinder 32 through the port 38 as the pinion 1 is rotated clockwise in order to assist movement of the rack 2 leftwardly. Conventional steering connections are shown at 40. The rack 2 and pinion 1 of FIGURE 4 are as shown in FIGURES 1 and 2 and as described hereinabove with respect to those figures. Details of the remaining structure shown in FIGURE 4 are intended to be illustrative and exemplary rather than limitative.

Figure 5:
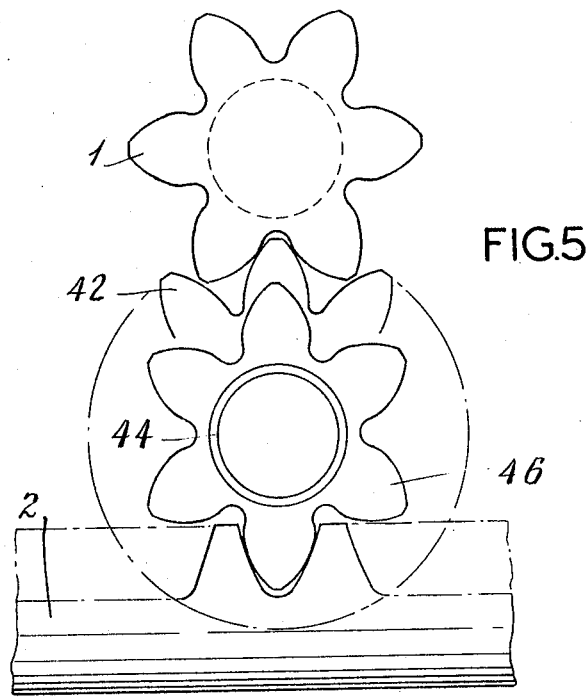
FIGURE 5 is a fragmentary front elevation view, similar to the left-most portion of FIGURE 1, of a modification, according to the present invention, wherein the rack is indirectly driven via an intermediate spindle having first and second reduction gears thereon.
Figure 6:
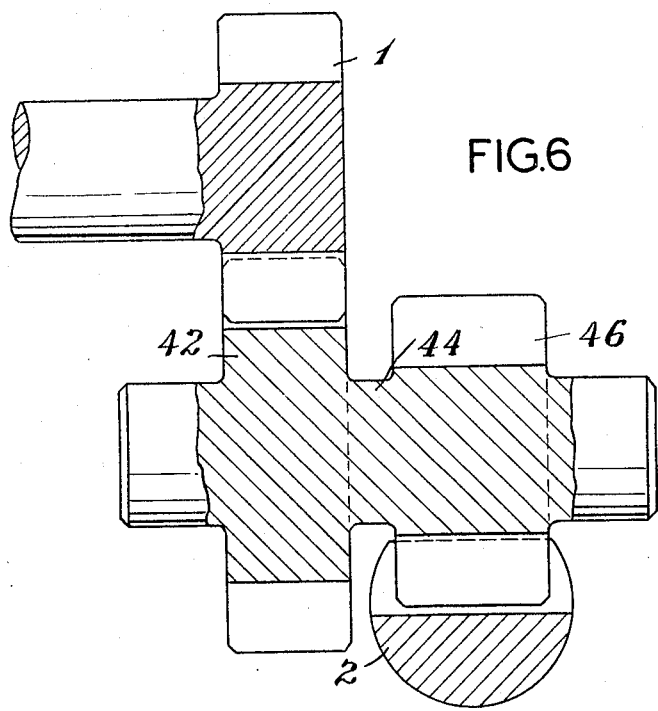
FIGURE 6 is a fragmentary side elevation view of the modification illustrated in FIGURE 5, some elements being partly cut away approximately along the vertical centerline plane of the intermediate spindle for clarity and succinctness in illustration.

Whilst in the described embodiment the driving pinion may be directly in mesh with the rack, there could be an intermediate spindle provided, carrying a first reduction pinion engaging with the pinion connected with a hand wheel spindle, and a second reduction pinion engaging with a variable pitch rack or sector as already described. This serves to increase both the maximum velocity ratio and the strength of the teeth. Such a modification is illustrated in FIGURES 5 and 6 wherein the driving pinion 1 is shown engaged with a first reduction pinion 42 fixed on the intermediate spindle 44. A second reduction pinion 46 also fixed on the intermediate spindle 44 is shown meshed with the variable pitch rack 2. As ordinary mechanics of average skill in the art will appreciate, interposition of the spindle 44 and pinions 42, 46 as shown will cause the rack 2 to move in the opposite direction for a given rotation of the steering column. This can be overcome in any well known manner, for instance by placing the rack 2 above the pinion 1 or by connecting the road wheel steering arms oppositely from the manner that would be employed with the embodiment of FIGURE 1. Additionally, if such a double-reduction arrangement is adopted, both stages could have variable-ratio and the ratio of the maximum to the minimum overall ratio can approach the square of the value possible with a rack and pinion only.

I claim:
1. A variable-ratio toothed gearing mechanism including a concentrically mounted driving pinion of circular form, all of the teeth thereof having substantially identical shape; and a meshing toothed driven member having at least one group of teeth thereon having relatively low pitch at one point thereon and having relatively high pitch an another point thereon thereby providing a relatively high velocity ratio at said one point and a relatively low velocity ratio at said other point, the teeth on said driven member between said point and said other point being constructed and arranged to provide a gradual progression of velocity ratio between said relatively high velocity ratio and said relatively low velocity ratio.

2. A gearing mechanism as claimed in claim 1, wherein the toothed driven member is a rack.

3. A gearing mechanism as claimed in claim 1, wherein the toothed driven member is a sector.

4. A gearing mechanism as claimed in claim 1, wherein the driven member has teeth of minimum pitch providing maximum velocity-ratio at the centre thereof and maximum pitch providing minimum velocity-ratio at the ends thereof, the transition from teeth of minimum pitch to teeth of maximum pitch being provided by progressive variation of pitch of the intervening teeth with a corresponding variation in the form of said intervening teeth.

5. A gearing mechanism as claimed in claim 4, wherein the gear combination additionally comprises a servo mechanism constructed and arranged to apply force to the driven member tending to move the driven member in the same sense in which the driven member is driven by said driving pinion thereby supplementing said driving pinion whereby force applied by the pinion to the driven member is multiplied.

6. A variable ratio toothed gearing mechanism including a first stage comprising a first concentrically mounted driving pinion of circular form, all of the teeth on said pinion having substantially identical shape, an intermediate spindle and a first reduction pinion on said spindle in meshing engagement with said first pinion; and a second stage comprising a second reduction pinion of said intermediate spindle and a driven member meshingly engaged by said second reduction pinion, said driven member having at least one group of teeth thereon having relatively low pitch at one point thereon and having relatively high pitch at another point thereon thereby providing a relatively high velocity ratio at said one point and a relatively low velocity ratio at said other point, the teeth on said driven member between said point and said other point being constructed and arranged to provide a gradual progression of velocity ratio between said relatively high velocity ratio and said relatively low velocity ratio.

7. A gearing mechanism as claimed in claim 6, wherein both stages of said gearing have a variable ratio.

References Cited by the Examiner
UNITED STATES PATENTS

| | | | |
|---|---|---|---|
| 1,171,131 | 2/1916 | Mason et al. | 74—498 |
| 2,973,658 | 3/1961 | Bishop | 74—498 X |
| 3,064,491 | 11/1962 | Bishop | 74—498 X |

MILTON KAUFMAN, *Primary Examiner.*